United States Patent [19]

Shimpo et al.

[11] Patent Number: 4,538,101
[45] Date of Patent: Aug. 27, 1985

[54] POWER SUPPLY DEVICE

[75] Inventors: Tetsuhiko Shimpo; Isao Fujihata, both of Tokyo, Japan

[73] Assignee: Nippon Chemi-Con Corporation, Tokyo, Japan

[21] Appl. No.: 500,672

[22] Filed: Jun. 3, 1983

[30] Foreign Application Priority Data

Jun. 4, 1982 [JP] Japan ............................. 57-95980
Aug. 14, 1982 [JP] Japan ...................... 57-123342[U]
Sep. 6, 1982 [JP] Japan ............................ 57-154882

[51] Int. Cl.$^3$ ............................................. G05F 1/46
[52] U.S. Cl. ................................... 323/272; 323/266; 363/86
[58] Field of Search ............................... 363/18-21, 363/65, 71, 72, 86, 95-98; 323/266, 267, 271-272

[56] References Cited

U.S. PATENT DOCUMENTS

4,359,679 11/1982 Regan ............................. 323/272
4,449,173 5/1984 Nishino et al. ............... 323/272 X Primary Examiner—Peter S. Wong
Attorney, Agent, or Firm—Sughrue, Mion, Zinn, Macpeak and Seas

[57] ABSTRACT

A power supply device includes a plurality of switching regulators and a waveshaping circuit, or, a switching circuit for converting an input voltage to switching pulses, a transformer for transforming the voltage of the pulses generated in the switching circuit, a rectifier circuit for rectifying the switching pulses provided through the transformer, a switching regulator into which the resulting d.c. input is supplied from the rectifier circuit and a waveshaping circuit. The former waveshaping circuit shapes the waveform of switching pulses generated within one switching regulator of the plurality of switching regulators and supplies the shaped output to the other switching regulators as an input reference waveform. The latter waveshaping circuit shapes the waveform of the switching pulses provided from the transformer and supplies the resulting function waveform to a pulse control unit in the switching regulator as an input reference waveform. In the case of a plurality of switching regulators of the separately excited type, a reference waveform supplied each switching regulator may be provided from a common waveform generator.

7 Claims, 12 Drawing Figures

POWER SUPPLY DEVICE

BACKGROUND OF THE INVENTION

The present invention relates to a power supply device, and more particularly, to a power supply device including a plurality of switching regulators which are synchronized with each other in their switching frequency.

Most electronic devices such as video cassette recorders (VCR) and video cameras, whether portable or installed on vehicles or the like, use batteries for driving power. But the terminal voltage of batteries may vary greatly when there occurs a sudden change in the load as a result of mode switching. To suppress these variations and stabilize the operation of the electronic devices, stabilizing power suppliers are currently used. These power supply devices use a switching regulator, and to provide an output voltage adaptive to more than one load, a plurality of switching regulators are necessary.

Figure 1:
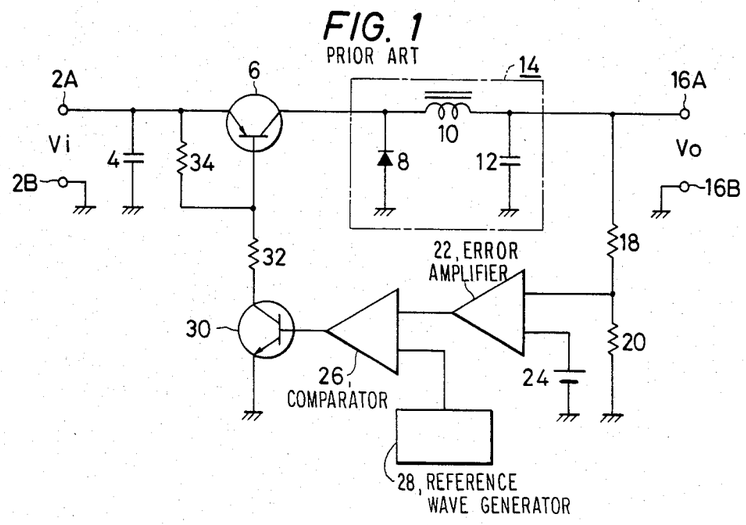
FIG. 1 is a circuit diagram showing a conventional switching regulator.

FIG. 1 shows a conventional separately excited switching regulator used in the power supply device contemplated by the present invention. A d.c. input Vi supplied across input terminals 2A and 2B has its ripple component removed in a capacitor 4 provided between the two input terminals. The input then is converted to an a.c. voltage in a switching transistor 6. The a.c. voltage is rectified in a d.c. reproducing circuit 14 composed of a diode 8, a choke coil 10 and a capacitor 12. Subsequently, the d.c. voltage is drawn from output terminals 16A and 16B as a stabilized d.c. output Vo.

Figure 2A:
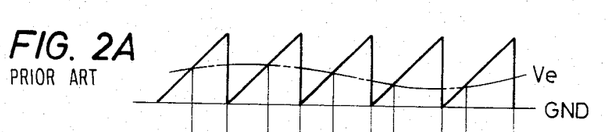
FIGS. 2 and 2B are diagrams showing the waveform of pulses produced by the switching regulator of FIG. 1.
Figure 2B:
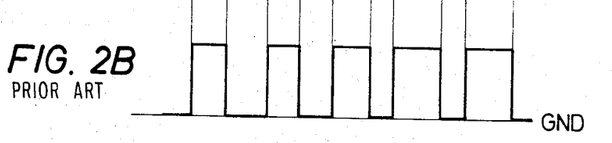

For drawing a voltage-divided bias from the d.c. output voltage Vo, resistors 18 and 20 are connected in series between terminals 16A and 16B. The divided output developing at the junction between the resistors 18 and 20 is fed to an error amplifier 22 where it is compared with a reference voltage provided by a reference power supply 24. The detected difference is fed to the non-inverting input terminal of a comparator 26, and an output comprising triangular waves as shown in FIG. 2A from a reference wave generator circuit 28 is supplied to the inverting input terminal of the comparator 26. In FIG. 2A, the varying output produced from the error amplifier 22 is denoted by Ve. Given the two inputs, the comparator 26 performs a pulse width modulating operation and generates pulses whose width is controlled by the varying output $V_e$ as shown in FIG. 2B. These pulses are fed to a transistor 30 as a control input, and in response to the switching operation of the transistor 30, a pulsive drive current flows into the switching transistor 6 through a resistor 32 and, thus, the transistor 6 conducts a switching operation. A bias resistor 34 is connected between the emitter and base of the switching transistor 6.

If a plurality of switching regulators having the above-described circuit configuration are assembled to make up a power supply device, a reference wave generator is necessary for each switching regulator. This first of all makes the overall configuration of the power supply device complex. In addition, if the oscillating frequencies of the individual generator circuits are not in synchronism with each other, serious beating may occur, and this phenomenon must be prevented by all means because it produces a noise problem and can cause incorrect operation during the oscillation and signal processing in internal circuits of VCR or video cameras. The same problem occurs if the regulators used are of a self-excited switching type having respective oscillation control units.

SUMMARY OF THE INVENTION

Therefore, the primary object of the present invention is to provide a power supply device including a plurality of switching regulators which are synchronized in the operation of pulse width control units and which use one common reference wave generator to simplify the overall design of the device.

This object can be achieved by a power supply device including a plurality of switching regulators and a waveshaping circuit that shapes the waveform of switching pulses generated within one switching regulator and which supplies the shaped output to the other switching regulators as an input with a controlled pulse width.

Further, this object can be achieved by shaping the waveform of the switching pulses produced on the secondary winding of a transformer into a function waveform and supplying the function waveform as an input to the pulse width control circuit in each of the switching regulators.

DETAILED DESCRIPTION OF THE PREFERRED EMBODIMENTS

Figure 3:
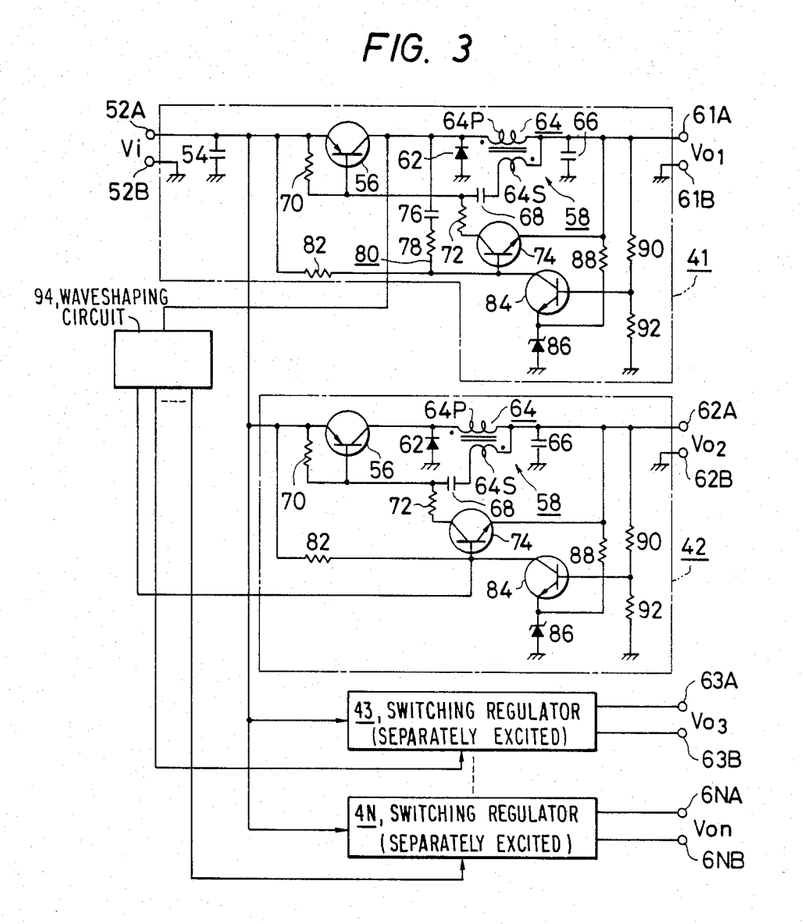
FIG. 3 is a circuit diagram showing an embodiment of the power supply device of the present invention.

A first embodiment of the power supply device of the present invention is hereunder described by reference to FIG. 3, wherein the device includes a plurality of switching regulators 41, 42, . . . , 4N. Of these regulators, 41 is of a self-excited type, and the others are of the separately excited type.

The switching regulator 41 has input terminals 52A and 52B, as well as a ripple absorbing capacitor 54 common to the other switching regulators. A d.c. input Vi supplied across the terminals 52A and 52B has its ripple component removed in the capacitor 54. The input then is converted to switching pulses in a transistor 56. The pulses are rectified in a d.c. reproducing circuit 58 and the resulting d.c. voltage is drawn from output terminals 61A and 61B as a stabilized d.c. output $V_{01}$. The d.c. reproducing circuit 58 is composed of a diode 62, a choke coil 64 and a capacitor 66. In the embodiment shown, the choke coil 64 is made of a primary winding 64P and a secondary winding 64S. These windings are arranged so that they produce pulses of opposite polarities. The switching pulses produced by the secondary winding 64S are fed back to the base of the switching transistor 56 through a differentiating capacitor 68. The differential pulses coming out of the capacitor 68 are in synchronism with the switching pulses, and in order to shorten the switching time of the transistor 56, these pulses are added to the base of the transistor 56 after being superimposed on control pulses issued from a transistor 74 to be described later.

A bias resistor 70 is connected between the base and emitter of the transistor 56. Between the base of that transistor and the output of the d.c. reproducing circuit 58 there is connected a transistor 74 through a resistor 72, with the collector connected to the base of the transistor 56 and the emitter to the d.c. reproducing circuit. A feedback circuit 80 including a capacitor 76 connected in series with a resistor 78 is provided between the base of the transistor 74 and the collector of the switching transistor 56. The base of the transistor 74 is provided with a bias from the d.c. input through a resistor 82. When the base of the transistor 74 is provided with a signal returned from the collector of the switching transistor 56 through the positive feedback circuit 80, the transistor 74 starts to oscillate and functions as a pulse width controlling oscillator that provides a drive current for the transistor 56. At the same time, the transistor 74 is capable of adding such drive current onto the reproduced d.c. output from the circuit 58.

The base of the transistor 74 is also connected to the collector of a transistor 84 for controlling the operating current flowing through transistor 74. The emitter of the transistor 84 is connected to a constant-voltage diode (Zener diode) 86 for providing a reference voltage, with the anode connected to ground. The emitter of the transistor 84 is also provided with the reproduced d.c. output through a resistor 88. The base of the transistor 84 is provided with the d.c. output after it is voltage-divided at the junction between resistors 90 and 92 connected in series between the output terminals 61A and 61B. In the transistor 84, voltage-divided bias is compared with the reference voltage which is the sum of the zener voltage on the diode 86 and the voltage across the base and emitter of the transistor 84.

Switching regulators 42 to 4N have the same circuit configuration as the switching regulator 41 except that they do not include the feedback circuit 80. They are designed so that stabilized outputs $V_{O2}$ to $V_{On}$ are drawn from respective pairs of output terminals 62A and 62B to 6NA and 6NB.

The switching pulses formed by the transistor 56 in the switching regulator 41 are drawn from the collector of that transistor and fed to a waveshaping circuit 94. The waveshaping circuit 94 enables the switching regulator 41 to function as a conventional reference waveform generator circuit with respect to the switching regulators 42 to 4N. For this purpose, the circuit is designed so that it shapes the switching pulses into the waveform of a reference function such as a triangular or sawtooth wave. The reference waveform generated by the waveshaping circuit 94 is sent to the base of a transistor 74 in each of the switching regulators 42 to 4N.

The device having the circuit configuration described above is operated as follows. The transistor 74 for providing a drive current through the switching transistor 56 starts to oscillate when the switching pulses formed by the transistor 56 are positively fed back to the base of the transistor 74. The current flowing to the base of the oscillating transistor 74 is controlled by the transistor 84, and this controlling operation of the transistor 84 depends on the d.c. output. Therefore, the control pulses supplied to the base of the transistor 56 upon oscillation of the transistor 74 constitute a pulsive signal whose pulse width is modulated depending upon the variation in the level of the d.c. output. In consequence, the transistor 56 performs a switching operation.

This control operation is performed continuously: the d.c. input supplied across the terminals 52A and 52B is passed through the transistor 56 where it is converted into switching pulses, which are rectified in the d.c. reproducing circuit 58 and are drawn from the output terminals 61A and 61B as a stabilized output $V_{O1}$. If there occurs a variation in the d.c. input on account of load fluctuation or other factors, the switching regulator 41 of the present invention achieves the intended stabilizing and controlling operation momentarily and thus keeps supplying a constant d.c. output to the load.

The switching pulses that develop at the collector of the transistor 56 as a result of its switching operation are applied to the primary winding 64P of the choke coil 64, and the secondary winding 64S produces pulses having their polarity reversed from those applied to the primary winding. The induced pulses are differentiated in the capacitor 68 and are fed to the base of the transistor 56. The respective edges of the differential pulses are in good agreement with those of the initial switching pulses, and the leading and trailing edges of each pulse change their potential levels in opposite directions. Therefore, the differential pulses are timed to the switching operation of the transistor 56 and can accelerate the turning-on and off of that transistor. As a result, the switching time of the transistor 56 is shortened, and at the same time, the transistor 56 produces sharp-edged pulses having short rise and fall times. In consequence, the power loss occurring in the switching period can be reduced and the transducing efficiency of the switching regulator 41 is increased.

The switching pulses produced at the collector of the transistor 56 are fed to the waveshaping circuit 94 where they are shaped to a reference waveform such as a triangular or sawtooth wave. This reference wave is supplied as a pulse width control input to the base of the transistor 74 in each of the separately excited switching regulators 42 to 4N, and this control input enables the switching regulators 42 to 4N to perform similar pulse width controlling operations as in the switching regulator 41: the d.c. input applied across the terminals 52A and 52B is converted to switching pulses in the transistor 56, and after they are rectified in the d.c. reproducing circuit 58, stabilized d.c. outputs $V_{O2}$ to $V_{On}$ are drawn from the respective output channels.

As described above, the switching regulators 42 to 4N are provided with pulses in a reference waveform that have been obtained by shaping the switching pulses produced by the transistor 56 in the switching regulator 41, and thus the respective switching regulators are operated at a synchronous switching frequency. Therefore, unlike the conventional system wherein each switching regulator had its own reference wave generating circuit, the power supply device of the present invention is free from the beating problem that occurred due to switching at different frequencies. As an obvious advantage, the use of a single reference waveform generator in the entire system provides a power supply device of a very simple design.

Figure 4:
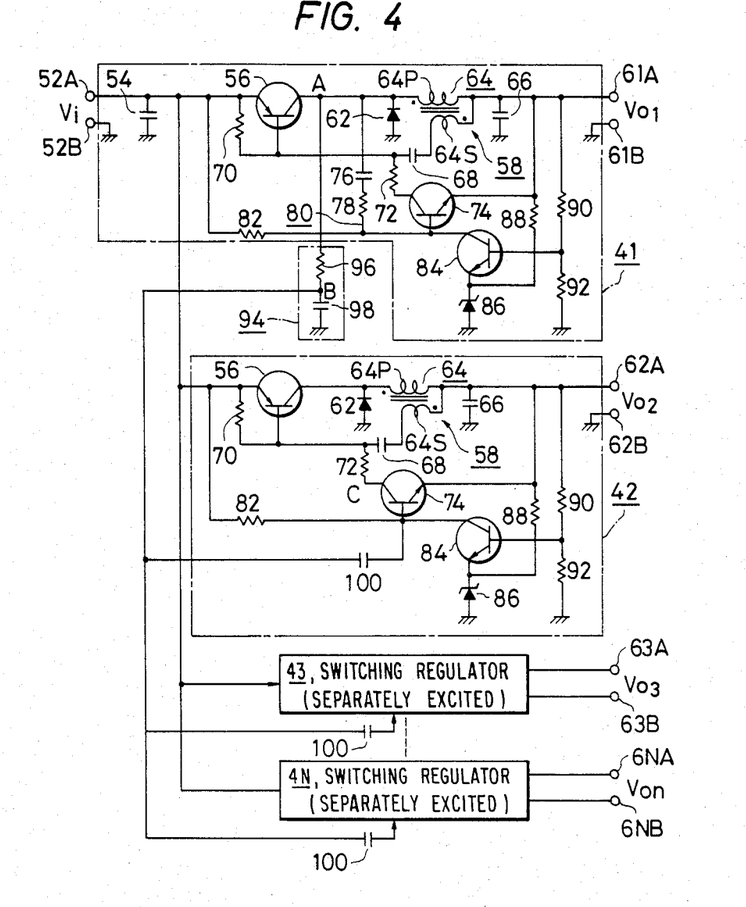
FIG. 4 is a circuit diagram showing a specific embodiment of the power supply device of the present invention.

FIG. 4 shows a more specific embodiment of the present invention, and FIG. 5 illustrates the waveforms of pulses generated in that embodiment. In this embodiment, the waveshaping circuit 94 is an integrator composed of a resistor 96 and a capacitor 98. The output of the integrator is supplied to the base of the transistor 74 in each of the switching regulators 42 to 4N through a capacitor 100. The integrator has a time constant selected so as to provide a waveshape having good linearity and peak value properties.

Figure 5A:
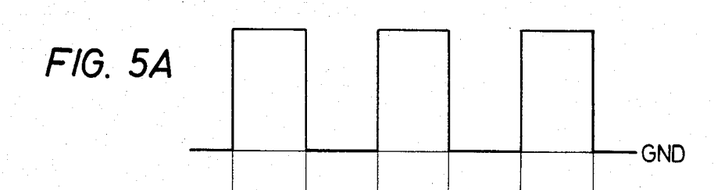
FIGS. 5A to 5C are diagrams showing the waveforms of pulses produced in the power supply device of FIG. 4.
Figure 5B:
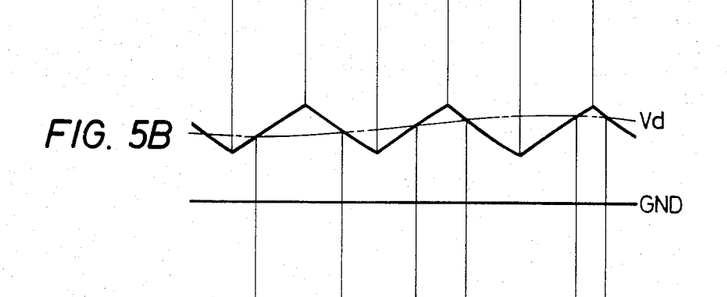
Figure 5C:
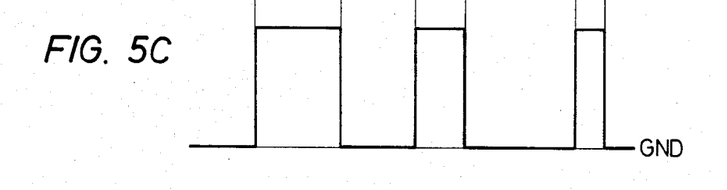

Suppose switching pulses having a waveform as shown in FIG. 5A are generated at the collector of the transistor 56 in the switching regulator 41. The waveshaping circuit 94 having the configuration described above shapes these switching pulses into a triangular wave as shown in FIG. 5B. This triangular waveform is supplied to the base of each of the switching regulators 42 to 4N through the capacitor 100. If the control level provided by the transistor 74 is indicated by Vd in FIG. 5B, control pulses having a waveform as shown in FIG. 5C are provided at the collector of the transistor 74. These control pulses are not in phase with the switching pulses shown in FIG. 5A, but the two types of pulses are generated at a synchronous frequency and cause no undesired phenomenon such as beating.

As shown above, the waveshaping circuit 94 configured as an integrator requires a minimum number of components and features a very simple circuit design. Furthermore, the use of fewer circuit components contributes to the reduction in the overall size of the power supply device.

In the embodiment shown above, the self-excited switching regulator in association with the waveshaping circuit 94 provides a reference waveform generator circuit for the other switching regulators 42 to 4N, but it should be understood that similar results are obtained if the reference pulses are drawn from the separately excited switchingregulators 42 to 4N.

As will be understood from the foregoing description, the power supply device of the present invention permits the use of more than one switching regulator without causing an unwanted beating problem that occurs if the switching regulators do not operate at a synchronous switching frequency. As further advantages, the power supply device of the present invention uses only one reference waveform generator and can be manufactured as a compact device.

A further embodiment of the power supply device of the present invention will now be described by reference to FIG. 6. The circuit of FIG. 6 has a capacitor 4 and a switching circuit 206 connected between two input terminals 2A and 2B. The capacitor 4 removes the ripple component from the input voltage. The switching pulses generated in the circuit 206 are supplied to a primary winding 208P of a transformer 208. The transformer has secondary windings 208Sa and 208Sb each having a center tap.

Rectifying diodes 210 and 212 are connected in series between the terminals of the secondary winding 208Sa. The cathode of each diode is connected to a common terminal. Between the anode of each diode and the center tap on the secondary winding 208Sa are connected a smoothing capacitor 214 and separately excited switching regulators 216 and 218. The capacitor terminal on the higher potential side is connected to the collector of a switching transistor 220, and the emitter of this transistor is connected to an output terminal 221A through a choke coil 226. The capacitor terminal on the lower potential side is connected to an output terminal 221B. Between the output terminal 221B and the emitter of the switching transistor 220 is connected a rectifying diode 228 with the cathode connected to the emitter. Between the output terminals 221A and 221B are connected a smoothing capacitor 230 and an error amplifier 232 that detects a variation in the d.c. output. The output from the error amplifier 232 is supplied to a pulse width control circuit 234, the controlled pulsive output of which is supplied to the base of the switching transistor 220.

Between the tap on the secondary winding 208Sa and its terminal on the anode side is connected a waveshaping circuit 236 that shapes the waveform of the switching pulses into a function waveform such as a triangular or sawtooth waveform. The output of the circuit 236 is applied as a reference waveform to the pulse width control circuit 234 through a capacitor 238.

Figure 6:
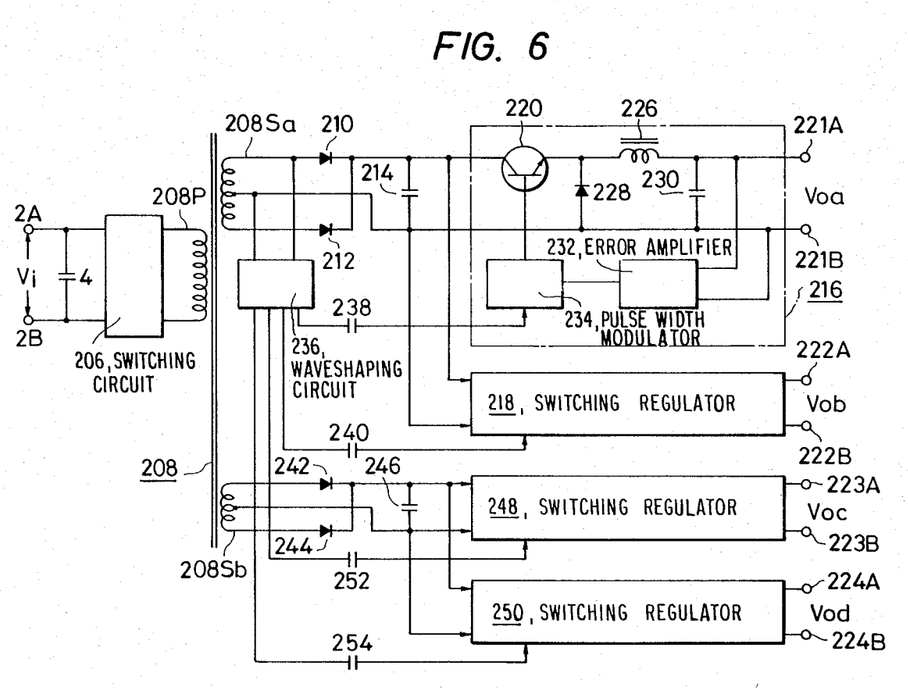
FIG. 6 is a circuit diagram showing another embodiment of the power supply device of the present invention.

The circuit of FIG. 6 also includes a switching regulator 218 which is configured the same as the switching regulator 216. The regulator 218 has a pulse width control circuit that is provided with the output of the waveshaping circuit 236 through a capacitor 240.

In the embodiment of FIG. 6, rectifying diodes 242 and 244 are connected in series between the terminals of the secondary winding 208Sb, and the cathode of each diode is connected to a common terminal. Between the anode of each diode and the center tap on the secondary winding 208Sb are connected a smoothing capacitor 246 and two other switching regulators of the separately excited type 248 and 250. The regulators 248 and 250 are configured in the same manner as the switching regulator 216 and are individually provided with the output from the waveshaping circuit 236 through respective capacitors 252 and 254.

The power supply device having the circuit configuration described above is operated as follows. The d.c. voltage supplied across the input terminals 2A and 2B is converted into switching pulses through the circuit 206. The switching pulses are supplied to the primary winding 208P of the transformer 208, whereupon the transformed switching pulses are generated on the secondary windings 208Sa and 208Sb. The switching pulses generated on the secondary winding 208Sa are supplied to the waveshaping circuit 236, while at the same time, they are subjected to full-wave rectification in the diodes 210 and 212, smoothed in the capacitor 214 and sent to the switching regulators 216 and 218. The switching pulses generated on the secondary winding 208Sb are likewise rectified in the diodes 242 and 244, smoothed in the capacitor 246 and supplied to the switching regulators 248 and 250.

The switching pulses supplied to the waveshaping circuit 236 are converted to a function waveform having a reference waveform such as a triangular or sawtooth wave. In the embodiment shown, the pulses are shaped into a sawtooth wave and supplied as a reference waveform to the pulse width control circuit 234 in each of the switching regulators 216, 218, 248 and 250.

In the switching regulator 216, the error amplifier 232 checks the output voltage Voa across the terminals 221A and 221B to detect a transient value or a variation in the steady-state value, and the output from the amplifier 232 is supplied to the pulse width control circuit 234 together with the waveshaped switching pulses. This initiates pulse width modulation in the circuit 234 which generates control pulses having an ON-OFF duty ratio adaptive to the detected variation in the d.c. output. These pulses are supplied to the base of the switching transistor 220, which starts a switching operation with a conduction time which suppresses the variation in the d.c. output. As a result of this switching operation, the d.c. voltage from the capacitor 214 is converted to an a.c. voltage, which is rectified and smoothed through the diode 228, choke coil 226 and capacitor 230 and drawn from the output terminals 221A and 221B as a stabilized d.c. output V$o_a$.

The above operations, which are momentarily effected and continuously repeated are also carried out simultaneously in the other switching regulators 218, 248 and 250, and stabilized d.c. outputs V$o_b$, V$o_c$ and V$o_d$ are individually drawn from the respective pairs of output terminals 222A/222B, 223A/223B, and 224A/224B.

In the stabilizing operation described above, no special circuit for generating a reference waveform is necessary except for the waveshaping circuit 236 that shapes the switching pulses produced in the secondary winding 208S$a$ of the transformer. Furthermore, the switching regulators 216, 218, 248 and 250 operate at a synchronous switching frequency because they receive the same reference waveform as a pulse width control input. The synchronism in the switching frequency prevents the unwanted beating phenomena from occurring in subsequent operation such as signal processing.

Figure 7:
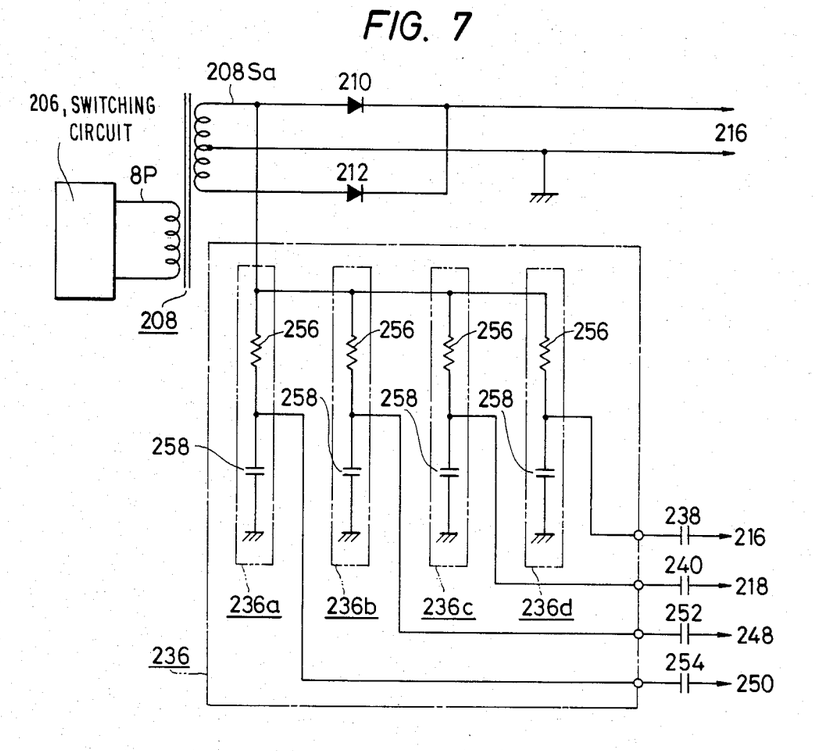
FIG. 7 is a circuit diagram showing an emobodiment of the waveshaping circuit used in the power supply device of FIG. 6.

A specific embodiment of the waveshaping circuit 236 is shown in FIG. 7, wherein the circuit 236 is composed of four integrators 236$a$, 236$b$, 236$c$ and 236$d$ connected between one terminal of the secondary winding 208S$a$ and the center tap. These integrators each include a resistor 256 and a capacitor 258 connected in series between the secondary winding and the tap and they are further connected to the switching regulators 216, 218, 248 and 250, respectively. A sawtooth waveform is generated at the junction between the resistor 256 and capacitor 258 in each integrator and the respective waveforms are individually drawn from capacitors 238, 240, 252 and 254 and supplied to the pulse width control circuit 234 in each switching regulator. In this way, the desired reference waveform can be easily produced by a very simple circuit configuration. One particular advantage is that the amplitude and linearity of the reference waveform can be set at desired values by properly selecting the time constants of the resistor 256 and capacitor 258. In the embodiment shown, the waveshaping circuit 236 is composed of four integrators to match the embodiment of FIG. 7, but it should be noted that the same reference waveform can be produced using more integrator circuits so as to be adaptive to an increased number of switching regulators installed in the power supply device.

Figure 8:
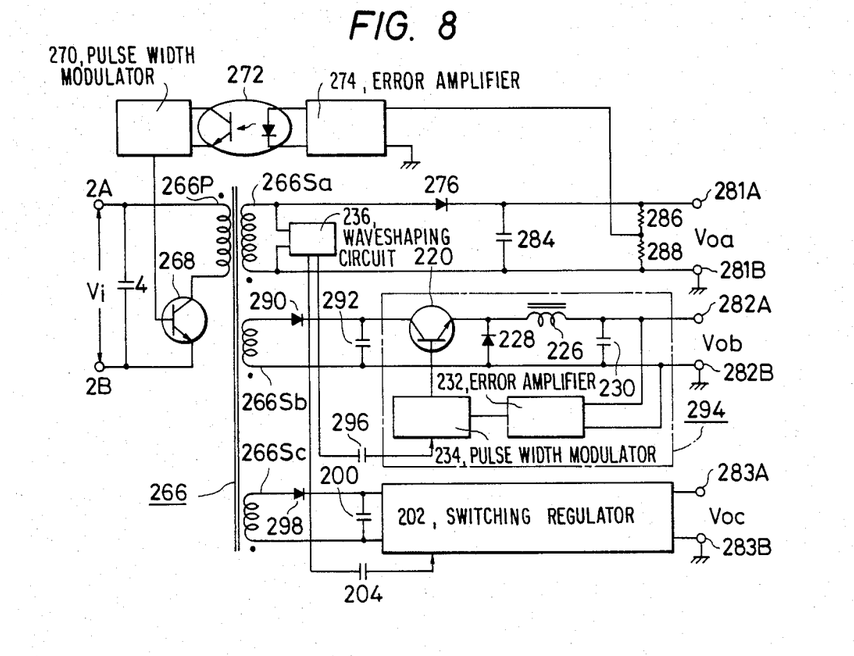
FIG. 8 is a circuit diagram showing still another embodiment of the present invention.

FIG. 8 shows another embodiment of the present invention, wherein the variation in the d.c. output is reflected in the switching operation at the input side by connecting the two sides with a photocoupler. As in the embodiment of FIG. 6, a ripple absorbing capacitor 4 and a primary winding 266P of a a transformer 266 are connected between input terminals 2A and 2B. The primary winding 266P is connected in series with a switching transistor 268, which is connected to a pulse width control circuit 270 which then is connected to an error amplifier 274 through a photocoupler 272.

The transformer has secondary windings 266S$a$, 266S$b$ and 266S$c$. The waveshaping circuit 236 is connected between the terminals of the secondary windings 266S$a$, and one terminal is connected to the anode of a diode 276. The cathode of the diode 276 is connected to an output terminal 281A. Likewise, the other terminal of the secondary winding 266S$a$ is connected to an output terminal 281B. Between the output terminals 281A and 281B are connected a smoothing capacitor 284 and a pair of resistors 286 and 288 for d.c. output detection. The voltage-divided bias that develops at the junction between the resistors 286 and 288 is supplied to the error amplifier 274. Therefore, in the embodiment of FIG. 8, a d.c. voltage V$o_a$ is produced at output terminals 281$a$ and 281$b$ without passing through a switching regulator.

The secondary winding 266S$b$ is connected to a capacitor 292 through a diode 290, and a switching regulator 294 is connected between the two terminals of the capacitor 292. The switching regulator 294 is configured as in the embodiment of FIG. 6: the pulse width control circuit 234 is provided with a reference waveform from the waveshaping circuit 236 through a capacitor 296, and the terminals of the capacitor 230 are connected to output terminals 282A and 282B from which a d.c. output V$o_b$ is drawn.

In a similar manner, the secondary winding 226S$c$ is connected to a capacitor 200 through a diode 298, and a switching regulator 202 is connected between the two terminals of the capacitor 200. The switching regulator 202 is configured in the same manner as the switching regulator 294: the output of the waveshaping circuit 236 is supplied through a capacitor 204 and a stabilized d.c. voltage V$o_c$ is drawn from output terminals 283A and 283B. The embodiment of FIG. 8 achieves the same advantages as those obtained with the embodiments of FIGS. 6 and 7.

As described above, the waveform of the switching pulses produced on the secondary winding of a transformer is shaped into a function waveform, and this waveform is supplied as an input to the pulse width control circuit in each switching regulator. Because of this arrangement, the present invention provides a power supply device that uses a plurality of switching regulators which require a simplfied circuit for generating a reference waveform and which can operate at a synchronous switching frequency. The synchronism in the switching frequency prevents unwanted phenomena such as beating from occurring in subsequent operations such as signal processing.

Figure 9:
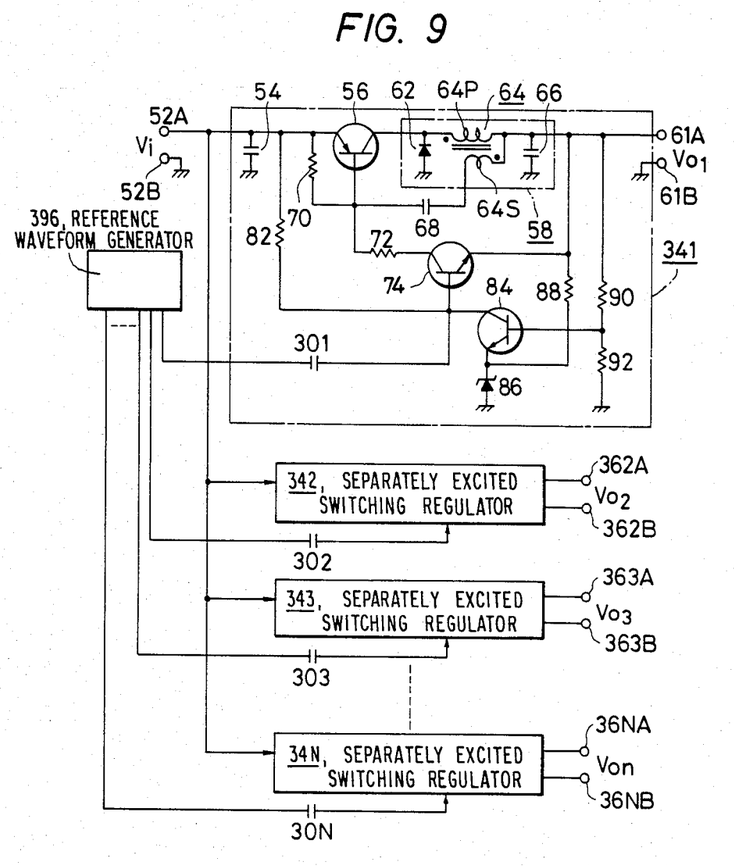
FIG. 9 is a circuit diagram showing one embodiment of the power supply device of the present invention.

A further embodiment of the power supply device of the present invention will now be described by reference to FIG. 9, wherein the device includes a plurality of switching regulators 341, 342, . . . , 34N, all of which are of the separately excited type.

The switching regulator 341 has input terminals 52A and 52B, as well as a ripple absorbing capacitor 54 common to the other switching regulators. A d.c. input Vi supplied across the terminals 52A and 52B has its ripple component removed in the capacitor 54. The input then is converted to switching pulses in a transistor 56. The pulses are rectified in a d.c. reproducing circuit 58 and the resulting d.c. voltage is drawn from output terminals 61A and 61B as a stabilized d.c. output v$o_1$. The d.c. reproducing circuit 58 is composed of a diode 62, a choke coil 64 and a capacitor 66. In the embodiment shown, the choke coil 64 is made of a primary winding 64P and a secondary winding 64S. These windings are arranged so as to produce pulses of opposite polarities. One end of each winding is connected to a common terminal, and the other end is connected to the base of the switching transistor 56 through a differentiating capacitor 68, so the switching pulses produced on the secondary winding 64S are fed back to the base of the transistor 56 through the capacitor 68. Therefore, differential pulses coming out of the capacitor 68 are in synchronism with the switching pulses, and in order to shorten the switching time of the transistor 56, those pulses are superimposed on control pulses issued from transistor 74.

A bias resistor 70 is connected between the base and emitter of the transistor 56. Between the base of that transistor and the output of the d.c. reproducing circuit 58 is connected a transistor 74 through a resistor 72, with the collector connected to the base of the transistor 56 and the emitter to the output of the d.c. reproducing circuit. The base of the transistor 74 is provided with a bias from the d.c. input through a resistor 82. The base of the transistor 74 is also connected to the collector of transistor 84 for controlling the operating current flowing through the transistor 74. The emitter of the transistor 84 is connected to a constant-voltage diode (Zener diode) 86 for providing a reference voltage with the anode connected to ground. The emitter of the transistor 84 is also provided with the reproduced d.c. output through a resistor 88. The base of the transistor 84 is provided with the d.c. output $V_{o1}$ after it is voltage-divided at the junction between resistors 90 and 92 connected in series between the output terminals 61A and 61B. In the transistor 84, the voltage-divided bias is compared with the reference voltage which is the sum of the zener voltage on the diode 86 and the voltage across the base and emitter of the transistor 84.

Switching regulators $34_2$ to $34_N$ have the same circuit configuration as the switching regulator $34_1$ and are so designed that stabilized outputs $V_{o2}$ to $V_{on}$ are drawn from respective pairs of output terminals $36_2A/36_2B$ to $36_NA/36_NB$.

The switching regulators $34_1, 34_2, \ldots, 34_N$ have one common waveform generator circuit 396 that generates a reference function wave such as a triangular or sawtooth wave. The reference waveforms produced from the circuit 396 are supplied to the base of transistors 74 in switching regulators $34_1, 34_2, \ldots, 34_N$ through respective capacitors $30_1, 30_2, \ldots, 30_N$. These waveforms are superimposed on the operating output from the transistor 74. Therefore, the common waveform generator 396 provides a pulse width modulating circuit together with the transistors 74 and 84 in each of the switching regulators $34_1, 34_2, \ldots, 34_N$.

The power supply device having the circuit configuration described above is operated as follows. When the reference waveform from the waveform generator 396 is supplied to the base of the transistor 74, the superposition of that waveform on the waveform of the operating output from the transistor 84 initiates a pulse width modulation. This provides a control on the current flowing to the base of the transistor 74. Since this control depends on the d.c. output, the control pulses supplied from the transistor 74 to the base of the transistor 56 constitute a pulsive signal whose pulse width is modulated depending upon the variation in the level of the d.c. output. In consequence, the transistor 56 performs a switching operation at an ON-OFF duty ratio that suppresses the variation in the d.c. output level.

This control operation is performed continuously: the d.c. input supplied across the terminals 52A and 52B is passed through the transistor 56 where it is converted into switching pulses, which are rectified in the d.c. reproducing circuit 58 and are drawn from the output terminals 61A and 61B as a stabilized output $V_{o1}$. If there occurs a variation in the d.c. input on account of load fluctuation or other factors, the switching regulator $34_1$ of the present invention achieves the intended stabilizing and controlling operation momentarily and thus keeps supplying a constant d.c. output to the load.

The switching pulses that develop at the collector of the transistor 56 as a result of its switching operation are applied to the primary winding 64P of the choke coil 64, and the secondary winding 64S produces pulses having a polarity reversed from those applied to the primary winding. The induced pulses are differentiated in the capacitor 68 and are fed to the base of the switching transistor 56. The respective edges of the differential pulses are in good agreement with those of the initial switching pulses, and the leading and trailing edges of each pulse change their potential levels in opposite directions. Therefore, the differential pulses are timed to the switching operation of the transistor 56 and can accelerate the turning-on and off of that transistor, as described above. As a result, the switching time of the transistor 56 is shortened, and at the same time, the transistor 56 produces sharp-edged pulses having short rise and fall times. In consequence, the power loss occurring in the switching period can be reduced and the transducing efficiency of the switching regulator $34_1$ is increased.

Similar pulse width control is performed in the switching regulators $34_2$ to $34_N$: the d.c. input supplied across the terminals 52A and 52B is converted to switching pulses in the transistor 56, and after these pulses are rectified in the d.c. reproducing circuit 58, stabilized d.c. outputs $V_{o2}$ to $V_{on}$ are drawn from the respective output channels.

As a particular advantage, one common reference waveform is used in performing pulse width control in each of the switching regulators $34_1, 34_2, \ldots, 34_N$, where the regulators can be operated at a synchronous switching frequency. Therefore, unlike the conventional system using a reference wave generator for each switching regulator, the power supply device of the present invention is free from the beating problem that may occur due to the switching at different frequencies. As an obvious advantage, the use of a single reference waveform generator in the entire system provides a power supply device of a very simple design.

As will be understood from the foregoing description, the power supply device of the present invention permits the use of more than one switching regulator without causing the beating phenomena that occurs if the switching regulators do not operate at a synchronous switching frequency. As further advantages, the power supply device of the present invention uses only one reference waveform generator and can be manufactured as a compact device.

What is claimed is:

1. A power supply device, comprising: a plurality of switching regulators; and a waveshaping circuit for shaping switching pulses generated within one of said switching regulators and for supplying the shaped output of said waveshaping circuit to the others of said switching regulators as an input reference waveform in order to synchronize the switching operations of the rest of said switching regulators, the output of each of said switching regulators supplying a different load.

2. A power supply device according to claim 1, wherein said waveshaping circuit comprises an integrating circuit for integrating said switching pulses to provide a sawtooth waveform as said shaped output.

3. A power supply device, comprising: a switching circuit for converting an input voltage to switching pulses; a transformer for transforming the voltage of the pulses generated in said switching circuit; a rectifier circuit for rectifying the switching pulses provided through said transformer; a switching regulator into which the resulting d.c. voltage is supplied from said rectifier circuit; and a waveshaping circuit for shaping the switching circuit provided from said transformer and for supplying the shaped output of said waveshaping circuit to said switching regulator as an input reference waveform in order to synchronize the switching operations.

4. A power supply device according to claim 3, wherein said waveshaping circuit comprises at least one integrator for shaping the switching pulses by integration to provide a sawtooth waveform as said shaped output.

5. A power supply device, comprising: a plurality of separately excited switching regulators, each of said regulators including feedback circuit means responsive to the regulator's switching operation, and to a shaped reference waveform for controlling the regulator's switching operation, so that, among all of said switching regulators, said switching operation is synchronized; and a waveform generator for providing each of said switching regulators with said shaped reference waveform, the output of each of said switching regulators supplying a different load.

6. A power supply device according to claim 1, said one switching regulator being of a self-excited type and including a switching circuit, means for driving said switching circuit, and feedback means between said switching circuit and an input of said driving means.

7. A power supply device according to claim 3, wherein said power supply device includes a plurality of said switching regulators each including pulse width control means, said waveshaping circuit being coupled to each said pulse width control means.

* * * * *